July 29, 1947. E. P. ESCHER 2,424,810
HOUSING AND CONVEYOR CONNECTIONS FOR SCREW CONVEYORS
Filed Aug. 11, 1944
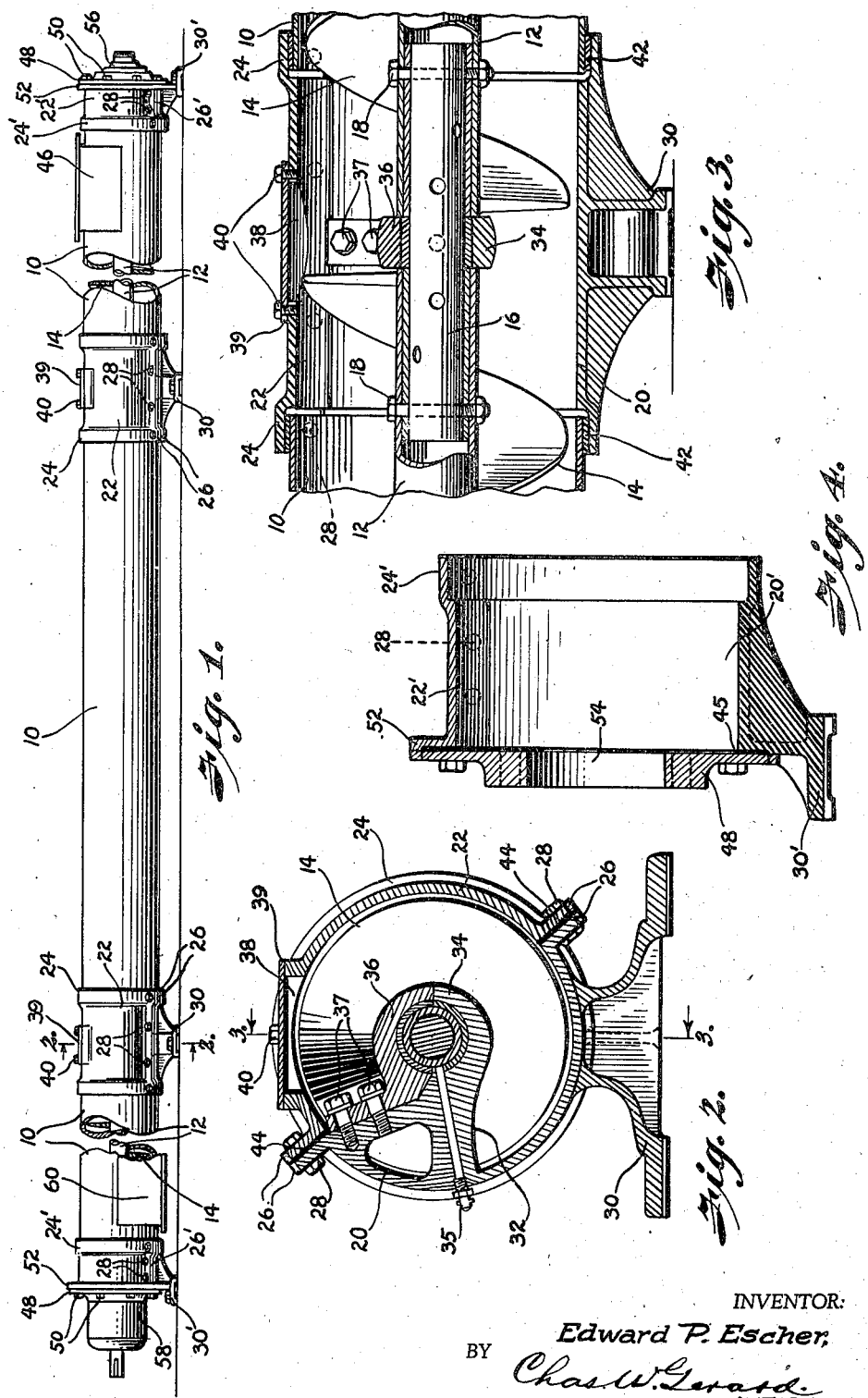
INVENTOR:
Edward P. Escher,
BY Chas. W. Gerard.
ATTORNEY.

Patented July 29, 1947

2,424,810

UNITED STATES PATENT OFFICE 2,424,810

HOUSING AND CONVEYOR CONNECTIONS FOR SCREW CONVEYORS

Edward P. Escher, Chicago, Ill., assignor to Screw Conveyor Corporation, Hammond, Ind., a corporation of Illinois Application August 11, 1944, Serial No. 549,004

2 Claims. (Cl. 198—213)

The present invention pertains to screw conveyor apparatus, and particularly to screw or spiral conveyors made up in lengths requiring multiple sections united by coupling and hanger structures at the several joints between the sections of the apparatus.

Accordingly it is the purpose of the present invention to provide improvements relating to the coupling and hanger or bearing structure required by apparatus of this character, with a view to simplifying both the construction and also the servicing operation which is required in case of replacements or should changes or adjustments become necessary at these points or connections between units of the apparatus.

For accomplishing this purpose I provide a screw conveyor apparatus of the character indicated in which the connections between the sections comprise coupling and bearing or hanger units which are also of a sectional type and provided not only with connections for joining the ends of the conveyor sections but also with projections fitting over the ends of the conveyor tubes or housing sections, thereby securing the latter in connected relation at the same time as the sections of said coupling and bearing units are secured and clamped together.

The improved construction is also designed to be of such a character as not only to facilitate the proper repair of the various parts of the conveyor apparatus, including such repairs as may require removal or replacement of whole tubes or housing or conveyor sections, but also to permit any essential endwise adjustment of the latter, as may be required for installing or servicing the apparatus.

With the foregoing general objects in view, the invention will now be described by reference to the accompanying drawing, illustrating a suitable and practical embodiment of the proposed improvements, after which those features and combinations involved in my improved construction will be particularly set forth and claimed.

In the drawing—

Figure 1 is an elevation illustrating a plurality of units or sections of screw conveyor apparatus provided with coupling and hanger or bearing structures, as well as a box end type of construction embodying the present features of improvement;

Figure 2 is a transverse section through one of the intermediate coupling and hanger or bearing units, the same representing a section taken on the line 2—2 of Figure 1;

Figure 3 is a longitudinal sectional view of the same, representing a section taken on the line 3—3 of Figure 2; and Figure 4 is a longitudinal sectional elevation of one of the sectional box end units.

The present invention involves improvements in the same general type of screw conveyor apparatus illustrated in patent to Kozak et al. No. 2,279,201, dated April 7, 1942, in which a screw conveyor of multiple sections employs coupler and hanger structures between the conveyor sections, and the connections at the various joints comprise outwardly projecting flanges formed on said coupler and hanger structures and also on the ends of the conveyor tubes or housings, together with bolts for securing the adjoining flanges together at the joints. It is the purpose of the present invention to simplify this joint construction by eliminating the flange design and attendant features and at the same time provide a tightly sealed and adjustable construction of fewer complications and adapted to be more readily and easily serviced.

In the drawing the improved construction is illustrated as comprising a plurality of integral or one-piece conveyor tubes or housing sections 10 which are of uniformly the same diameter and provided with matching screw conveyor sections which may be made up of a tubular shaft 12 carrying a screw conveyor flight portion 14. The adjoining sections of screw conveyor are adapted to be joined together in continuous endwise relation by means of couplings 16 and bolts 18 as described in patent to Kozak No. 2,260,811, dated October 28, 1941.

Each of the intermediate coupling and bearing units comprises semicylindrical housing portions 20 and 22 having bellmouthed edge portions or semicylindrical sections as indicated at 24, cooperating to fit over the ends of adjoining conveyor tubes 10 and to which they are securely clamped and held by means of mating ribs or projections 26 and bolts 28 as illustrated in Figures 1 and 2. These projecting ribs 26 define the plane of separation between said housing portions 20 and 22, which is at an angle to the vertical, and the lower section 20 is formed integral with and carried by the base or supporting standard 30. This housing portion or section 20 of the coupling and bearing unit is further provided with an inwardly projecting web or hanger arm 32, the inner end 34 of which is formed as one part 34 of a split bearing structure, the other part of which is shown as a cap bearing element 36 having the bolts 37 and thus cooperating with the bearing part 34 to provide the hanger or bearing structure for the shaft coupling 16.

Each coupling and bearing unit is equipped with the usual lubricating fitting 35, and preferably each of the housing portions or sections 22 of the coupling and bearing units is also provided with an inspection opening 38 at the top of the unit when assembled, and provided with a cover plate 39 and suitable bolts 40 for securing the plate in place over said opening 38, as shown in Figures 1 and 3.

In fitting the ends of the conveyor tubes 10 within the bellmouthed portions 24 at the opposite sides of the coupling and bearing units, a gasket 42 of suitable width is applied to the end of each tube for tight sealing purposes, when the parts are clamped together by the action of the bolts 28. As illustrated, the width of the semi-cylindrical projections or bellmouthed portions 24 is designed to be ample, or exceeding the average projection of the tube 10 into the coupling unit (corresponding to the width of said gasket) so as to provide a substantial range of longitudinal adjustment of the tube or housing sections 10 as may be required.

The projecting rib portions 26 may also be appropriately recessed as indicated at 44, for the use of suitable packing material.

At each end of the apparatus a box end supporting unit is provided for connection with the ends of the corresponding conveyor and housing sections, the drawing showing one such unit at what is represented as the feed end of the conveyor apparatus and adjacent to the feed spout 46 with which the initial conveyor and housing section is equipped. The construction of this box end unit is of similar split formation to that already described for the intermediate coupling and hanger units, that is, having the split semicylindrical portions 20' and 22' formed with the securing ribs or flanges 26' for the bolts 28, and the section 20' having the supporting base or stand 30'. Each box end unit is in effect a half coupling or hanger unit, for coupling to only one end of a conveyor and housing section and accordingly having only one flaring or bellmouthed structure 24'; and in place of the interior hanger or bearing structure (such as shown in Figures 2 and 3), an end plate 48 is secured by bolts 50 to a split flange 52 formed on the semicylindrical parts 20' and 22'. This end plate is provided with a suitable opening 54 for the mounting of a conventional end thrust bearing unit 56 for the end of the conveyor shaft; and corresponding to this, at the opposite end of the conveyor apparatus, the box end unit is equipped with a conventional drive end bearing unit 58 for connection with the drive end of the conveyor, this end of the apparatus being illustrated in Figure 1 as having an ordinary form of discharge spout 60.

Preferably also, the opposed faces of the parts 20' and 22' are appropriately recessed (as indicated at 45) for the use of suitable packing material.

With the construction as above described, the opposite ends of the conveyor shafts 12 are removably coupled with adjoining conveyor sections, by means of the adjustable couplings 16 and bolts 18, and these coupled ends are thus removably journaled in the sectional bearing structures 34—36 supported within the coupling and bearing units 20—22, being carried by the lower sections 20 of said units. Moreover, the opposite ends of the cylindrical conveyor housing sections 10 are fitted within the bellmouthed portions 24 of said units 20—22 and thereby clamped in accurately alined relation when the sections of said units are secured by the bolts 28 as shown in Figure 1.

With such a construction it will be apparent that in order to obtain access to the interior bearing parts at any joint between the sections of the conveyor it is merely necessary to remove the bolts 28 connecting the two sections of the coupling and bearing unit 20—22 at that joint and remove the upper section 22. If the repair operation requires removal of a section of the conveyor housing 10 or a section of the conveyor, then it is simply necessary to remove the sections 22 of the coupling units at both ends of the conveyor section, and also the bearing cap elements 36 by detaching the screws 37, after which the shaft coupling elements 16 (by removing the bolts 18) may be shifted endwise as described in the aforesaid Patent #2,260,811, thus freeing the opposite ends of the conveyor housing section 10 and its conveyor section 12—14 and permitting their removal and repair or replacement.

With reference to the conveyor sections, at either end of the apparatus, the same operation is of course facilitated by the type of sectional construction shown for the corresponding box end units. It is also to be noted that in addition to the use of the gaskets 42, for the ends of the conveyor housing sections 10, provision is made for suitable endwise adjustment of said housing sections within the bellmouthed ends 24 of the coupling and bearing units, as may be required for taking up slight variations in the length of the conveyor sections or tubes in actual practice.

It will thus be apparent that I have devised a practical and efficient type of construction for carrying out the aforesaid objects of my invention, and while the arrangement and construction illustrated are found to represent satisfactory embodiments of my improvements I desire to be understood as reserving the right to make all changes or modifications which may properly be deemed to fall within the spirit and scope of my invention as defined by the appended claims.

Having thus described my invention, what I claim and desire to secure by Letters-Patent is:

1. A coupling and bearing unit for the ends of sectional screw conveyor apparatus, comprising a bearing stand having a base or supporting standard and a sectional housing structure having semicylindrical mouth portions for fitting telescopingly over the end of a cylindrical conveyor tube and adapted to be contracted into clamping engagement therewith, bearing means within said housing structure for corresponding portions of the screw conveyor, and means for removably securing and drawing together the sections of said housing structure and thereby clamping said end of the conveyor tube within said semicylindrical mouth portions of the housing structure.

2. A coupling and bearing unit for the joints of sectional screw conveyor apparatus, comprising a bearing stand having a base or supporting standard and a sectional housing structure having oppositely extending semicylindrical clamping portions for fitting telescopingly over the ends of adjoining conveyor tubes and adapted to be contracted into clamping engagement therewith, bearing means within said housing structure for corresponding portions of the screw conveyor, and means for removably securing and drawing together the sections of said housing structure and thereby clamping said ends of the conveyor tubes within said semicylindrical clamping portions of the housing structure.

EDWARD P. ESCHER.

REFERENCES CITED

The following references are of record in the file of this patent:

UNITED STATES PATENTS

| Number | Name | Date |
| --- | --- | --- |
| 272,006 | Webster et al. | Feb. 6, 1883 |
| 275,153 | Craik | Apr. 3, 1883 |
| 357,624 | Piel | Feb. 15, 1887 |
| 666,316 | Kenneally | Jan. 22, 1901 |
| 1,032,850 | Mount | July 16, 1912 |
| 1,359,989 | Hiegel | Nov. 23, 1920 |
| 1,854,855 | Nakashima | Apr. 19, 1932 |
| 2,103,145 | Carter | Dec. 21, 1937 |
| 2,151,253 | Whitney | Mar. 21, 1939 |
| 2,260,812 | Kozak | Oct. 28, 1941 |
| 2,279,201 | Kozak et al. | Apr. 7, 1942 |